United States Patent [19]

Yonemitsu et al.

[11] 4,038,343

[45] July 26, 1977

[54] RESIN COMPOSITION CONTAINING COPOLYPHENYLENE ETHER

[75] Inventors: Eiichi Yonemitsu, Yokkaichi; Akitoshi Sugio, Ohmiya; Masanobu Masu, Kana; Takao Kawaki; Yukio Sasaki, both of Tokyo, all of Japan

[73] Assignee: Mitsubishi Gas Chemical Company, Inc., Tokyo, Japan

[21] Appl. No.: 623,328

[22] Filed: Oct. 17, 1975

[30] Foreign Application Priority Data

Oct. 18, 1974 Japan .............................. 49-119748

[51] Int. Cl.$^2$ ...................... C08L 25/04; C08L 33/04; C08L 51/04; C08L 53/02

[52] U.S. Cl. .............................. 260/874; 260/45.7 P; 260/47 ET; 260/876 R; 260/876 B; 260/880 R; 260/880 B; 260/888; 260/897 R; 260/898; 260/899; 260/901

[58] Field of Search .............. 260/874, 876 R, 47 ET, 260/880 R, 888, 897 R, 898, 899, 901

[56] References Cited

U.S. PATENT DOCUMENTS

| | | | |
|---|---|---|---|
| 3,383,435 | 5/1968 | Cizek ................................. | 260/874 |
| 3,749,693 | 7/1973 | Cooper ............................. | 260/47 ET |
| 3,952,072 | 4/1976 | Yonemitsu et al. .................. | 260/874 |

*Primary Examiner*—Murray Tillman
*Assistant Examiner*—Thurman K. Page
*Attorney, Agent, or Firm*—Wenderoth, Lind & Ponack

[57] ABSTRACT

A resin composition comprising (A) 5 to 95 parts by weight of a copolyphenylene ether derived from a mixture of 50 to 98 mole% of a 2,6-dialkylphenol and 2 to 50 mole% of a 2,3,6-trialkylphenol and (B) 5 to 95 parts by weight of a styrene resin. The composition has superior thermal resistance and oxidation stability under heat and satisfactory mechanical properties, and retains these desirable properties after heat-aging. The composition is suitable for preparation of molded articles.

4 Claims, No Drawings

RESIN COMPOSITION CONTAINING COPOLYPHENYLENE ETHER

This invention relates to a resin composition containing a copolyphenylene ether derived from a mixture of a 2,6-dialkylphenol and a 2,3,6-trialkylphenol which has improved thermal resistance and oxidation stability under heat, and good mechanical properties and moldability.

While polyphenylene ethers typified by poly-(2,6-dimethyl-1,4-phenylene) ether are known to be thermoplastic resins having good thermal resistance and mechanical and electrical properties, they have the defect of poor moldability and oxidation stability under heat when used alone. This defect has precluded these polymers from a wide range of application as industrial resin materials or general molding materials. Attempts have been made to remedy this defect by blending various resins, especially styrene resins, with the polyphenylene ethers thereby to improve the moldability of the polyphenylene ethers and use the resulting resin compositions as general molding materials (for example, U.S. Pat. No. 3,383,435 and Japanese Patent Publication No. 17812/68). These resin compositions can be molded at low temperatures, but cannot be free from deterioration in thermal resistance or mechanical properties. No attention has been paid to the substantial modification of the polyphenylene ether for improving its oxidation stability under heat, and attempts made were, for example, merely to lower the molding temperature by mixing it with other resins and thus prevent its oxidative decomposition under heat, or to maintain its oxidation stability by adding a heat stabilizer.

We previously worked on the copolymerizability of monomeric phenols in their oxidative polycondensation in an attempt to improve the properties of a polyphenylene ether obtained from a single monomeric phenol and to advance the technique of preparing polyphenylene ether-type polymers. This led to the discovery that combinations of 2,6-dialkylphenols and 2,3,6-trialkylphenols exhibit very good copolymerizability and the resulting polyphenylene ether copolymers having unexpectedly good properties.

Accordingly, it is an object of this invention to provide a resin composition containing a copolyphenylene ether derived from a mixture of a 2,6-dialkylphenol and a 2,3,6-trialkylphenol, which is suitable for producing molded articles having improved thermal resistance and oxidation stability under heat and satisfactory mechanical properties.

We have extensively studied resin compositions comprising the copolyphenylene ether and other resins, and found that resin compositions prepared by mixing certain polyphenylene ether-type copolymers with styrene homopolymers or styrene copolymers are free from the above-mentioned defect of resin compositions containing the polyphenylene ether homopolymer and can be very useful molding resin materials.

According to this invention, there is provided a thermoplastic blended resin composition comprising 1. 5 to 95% by weight of the copolyphenylene ether composed of 50 to 98 mole% of a structural unit, derived from a 2,6-dialkyl phenol, of the formula

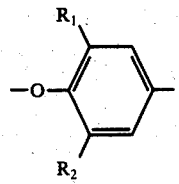

wherein $R_1$ and $R_2$ are identical or different, and represent a lower alkyl group and 2 to 50 mole% of a structural unit, derived from a 2,3,6-trialkyl phenol, of the formula

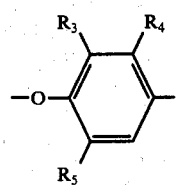

wherein $R_3$, $R_4$ and $R_5$ are identical or different and represent a lower alkyl group, the total proportion of the two units being 100 mole% based on the copolymer, and 2. 5 to 95% by weight of at least one styrene resin selected from the group consisting of styrene homopolymers and styrene copolymers and containing at least 50% of a structural unit of the formula

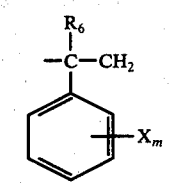

wherein $R_6$ is a hydrogen atom or lower alkyl group, X is a halogen atom selected from chlorine and bromine or a lower alkyl group, and $m$ is zero or an integer of 1 or 2, the total amount of resin components (1) and (2) being 100% by weight based on the total weight of the resin composition.

The resin compositions of this invention are novel and have superior improved properties compared to conventional resin compositions comprising polyphenylene ether homopolymers and styrene resins. These properties cannot be attained by the conventional resin compositions. Specifically, the resin compositions of this invention have superior thermal resistance, oxidation stability under heat, high resistance to surface tracking and mechanical properties such as tensile strength, flexural strength, elongation or impact resistance, and are especially characterized by retaining their initial properties after heat-aging. These superior properties are ascribable to the copolyphenylene ethers which have themselves outstanding thermal resistance, oxidation stability under heat and high resistance to surface tracking. The resin compositions of this invention also have good moldability while retaining high levels of these properties, and thus are useful as molding compounds.

The copolyphenylene ether used in the resin composition of this invention is a copolymer derived from a monomeric mixture of 98 to 50 mole% of a 2,6-dialkylphenol (the alkyl being methyl or ethyl) and 2 to 50 mole% of a 2,3,6-trialkylphenol (the alkyl being methyl or ethyl). The copolymer can be prepared by passing oxygen or an oxygen-containing gas through a solution containing the above monomeric phenols, a catalyst and a solvent for the monomeric phenols. All catalysts heretofore known for use in the oxidative coupling of monomeric phenols are feasible in preparing the copolyphenylene ether in accordance with the invention. Specifically, the catalyst that can be used is a combination of one metal-containing compound selected from copper-containing compounds, maganese-containing compounds and cobalt-containing compounds and one amine selected from primary, secondary and tertiary amines. Combinations of the copper-containing compounds with amines are especially preferred.

In the preparation of the copolyphenylene ether, a predetermined amount of the 2,3,6-trialkyphenol is added all at once to the 2,6-dialkylphenol, and the mixture is then reacted. Alternatively, as the reaction of one of the monomers proceeds, the other monomer may be added with a time lag. Another feasible procedure comprises polymerizing the two monomers separately from each other to the desired degree of polymerization, and then combining the reaction mixtures, followed by performing an oxidative copolycondensation reaction of these.

The proportion of a structural unit derived from the 2,3,6-trialkylphenol in the copolyphenylene ether used in this invention is 2 to 50 mole%, preferably 2 to 20 mole%. When the proportion of the 2,3,6-trialkyl phenol in the monomer mixture exceeds 50 mole%, it is difficult to perform the polymerization reaction smoothly, and since the solubility of the copolymer in the reaction solvent is low, the product frequently precipitates during the reaction and its molecular weight cannot be sufficiently increased. Furthermore, the resulting copolymer would be too rigid and very hard, and have low elasticity. On the other hand, when the proportion is less than 2 mole%, the resulting copolymer exhibits no new characteristic properties.

The other component of the composition of this invention is a styrene resin selected from the group consisting of a styrene homopolymer and a styrene copolymer. The styrene homopolymer denotes homopolymers of styrene and its derivatives typified by α-methylstyrene, vinyl toluene or nucleus-chlorinated styrene and copolymers of these with each other. The styrene copolymer denotes copolymers of styrene or its derivative with other monomers copolymerizable therewith, for example, olefins typified by ethylene or propylene, acrylic compounds typified by acrylonitrile or methyl methacrylate, or conjugated diene compounds typified by butadiene, isoprene or chloroprene. For example, the polystyrene copolymer includes high impact polystyrenes, a styrene/acrylonitrile copolymer, a styrene/butadiene copolymer, a styrene/isoprene copolymer, a styrene/chloroprene copolymer, a styrene/methyl methacrylate copolymer, a styrene/butadiene/acrylonitrile copolymer, an ethylene/styrene copolymer, a propylene/styrene copolymer, and an ethylene/propylene/butadiene/styrene copolymer. These styrene copolymers may preferably contain at least 50% of a structural unit derived from styrene or its derivative.

The mixing ratio between the resin components (1) and (2) in the resin composition of this invention differs according, for example, to the types of the resin components to be mixed, the chemical composition of the copolyphenylene ether, the type or properties of the styrene resin or the purpose of using the final composition. Usually, the copolyphenylene ether can be added in a proportion of 5 to 95% by weight, preferably 15 to 80% by weight.

If desired, a rubbery polymer may be further be incorporated in the composition of this invention. Examples of the rubbery polymer are polymers of conjugated diene compounds typified by polybutadiene or polyisoprene, copolymer rubbers having a polymer structure derived from conjugated diene compounds, typified by styrene/butadiene rubber or acrylonitrile/butadiene rubber, and copolymer rubbers having a polymer structure derived from monoolefin compounds, typified by ethylene/propylene rubber, ethylene/butylene/styrene copolymer rubber, or butylene rubber. When the rubbery polymer is incorporated in the composition of this invention, an improvement is noted in its mechanical properties, especially its impact strength. The amount of the rubbery polymer is 2 to 10% by weight based on the entire composition.

The copolyphenylene ether and the styrene resin can be mixed by any conventional method. These methods are classified into physical methods such as a method comprising mixing the resin components in solution using a common solvent and adding a precipitant to coprecipitate them, a method comprising mixing the resin components in a blender and then extruding the mixture through an extruder, or a method comprising kneading the resin components by a Banbury mixer or kneader, and chemical methods such as a method comprising polymerizing or copolymerizing a styrene or a mixture of a styrene and a comonomer and then coprecipitating the product, or a method comprising oxidatively copolycondensing a 2,6-dialkylphenol and a 2,3,6-trialkylphenol in the presence of the styrene resin and then coprecipitating the product.

If desired, various additives can be incorporated in the resin composition of this invention. These additives include, for example, heat stabilizers, pigments, fire retarding agents, plasticizers, lubricants, ultraviolet absorbers, coloring agents, or fibrous reinforcing materials such as glass fibers or asbestos fibers. Other resin components may be added so long as they do not impair the properties of the resin composition.

The following Examples further illustrate the resin compositions of this invention. All parts in these examples are by weight.

EXAMPLE 1

A monomeric phenol mixture of 2,6-dimethylphenol/2,3,6-trimethylphenol in a molar ratio of 90/10 (5 parts) was dissolved in 50 parts of toluene, and 0.03 part of cuprous iodide and 3.6 parts of n-butylamine were added. With stirring, air was passed through the solution to perform an oxidative polycondensation of the mixture. The resulting copolyphenylene ether had an intrinsic viscosity $[\eta]$, as measured in chloroform at 25° C. (the same method is used in the following Examples), of 0.55 (dl/gr.)

50 Parts of the copolyphenylene ether was mixed throughly with 50 parts of commercially available high impact polystyrene [a rubber-modified polystyrene having a flow value, as measured under a load of 15 Kg/cm$^2$ at 200° C. and using Koka-type flow tester with a nozzle having a a diameter of 1 mm and a length of 2mm, (a product of Shimadzu Seisakusho Ltd.) of 20 × 10$^{-3}$ cc/sec], 5 parts of triphenyl phosphate, 7 parts of titanium oxide and 1 part of a heat oxidation stabilizer by means of a Henschel mixer, and the mixture was extruded through a twin-screw extruder to form a blended resin composition. The composition was injection-molded at an injection pressure of 1,100 Kg/cm$^2$ and a maximum injection temperature of 270° C. The resulting molded article (designated as A) had the properties shown in Table 1.

The above procedure was repeated except that 50 parts of poly(2,6-dimethyl-1,4-phenylene)ether having an intrinsic viscosity of 0.55 dl/g was used instead of the copolyphenylene ether. The properties of the molded article (designated as B) are also shown in Table 1.

Table 1

| Molded articles | A | | B | |
|---|---|---|---|---|
| Properties | Initial stage | After aging at 120° C for 200 hours | Initial stage | After aging at 120° C for 200 hours |
| Heat distortion temperature (° C, a load of 18.4 Kg/cm$^2$) | 138 (after annealing) | | 128 (after annealing) | |
| Tensile strength (Kg/cm$^2$) | 665 | 665 | 608 | 600 |
| Flexural strength (Kg/cm$^2$) | 1030 | 1035 | 970 | 960 |
| Elongation (%) | 35 | 25 | 30 | 16 |
| Izod impact strength (Kg.cm/cm, using ⅛" notched bar) | 12 | 11 | 9 | 5 |
| Tensile impact strength (Kg.cm/cn$^2$) | 130 | 110 | 92 | 45 |

EXAMPLE 2

A copolyphenylene ether having an intrinsic viscosity of 0.5 dl/g was prepared in the same way as in Example 1 except that a mixture of 2,6-dimethylphenol and 2,3-dimethyl-6-ethylphenol in a molar ratio of 95:5 was used instead of the mixture of 2,6-dimethylphenol and 2,3,6-trimethylphenol.

50 Parts of the copolyphenylene ether was thoroughly mixed using a Henschel mixer with 35 parts of the same high impact polystyrene as used in Example 1, 15 parts of a mixture in a weight ratio of 1.1:1.0 of a styrene/butadiene block copolymer (commercially available; a 20% by weight toluene solution of this copolymer is a viscosity of 1,500 cps at 25° C. as measured by a Brookfield Model RVT Viscometer) and polystyrene (commercially available polystyrene having a flow value, as measured under a load of 60 Kg/cm$^2$ at 200° C. using a Koka-type flow tester with a nozzle having a diameter of 1mm and a length of 2mm, a product of Shimadzu Seisakusho Ltd., of 2.3 × 10$^{-1}$ cc/sec), 5 parts of triphenyl phosphate, 7 parts of titanium oxide and 1 part of a heat stabilizer. The mixture was extruded through a twin-screw extruder to form a blended resin composition. The composition could be easily molded at an injection pressure of 1,100 Kg/cm$^2$ and a maximum injection temperature of 260° C. The molded article had a heat distortion temperature (after annealing) of 130° C., a tensile strength of 560 Kg/cm$^2$, an elongation of 40%, a flexural strength of 890 Kg/cm$^2$, an Izod impact strength (using a ⅛ inch notched bar) of 17 Kg.cm/cm, and a tensile impact strength of 150 Kg.cm/cm$^2$. After the molded article was aged in hot air at 120° C. for 200 hours, it retained more than 90% of the initial values of these properties.

EXAMPLE 3

2,6-Dimethylphenol was oxidatively polymerized in toluene using a copper-amine complex catalyst while uniformly adding 2,3,6-trimethylphenol dropwise to the reaction system. The resulting copolyphenylene consisted of 2,6-dimethylphenol and 2,3,6-trimethylphenol in a molar ratio of 85:15 and had an intrinsic viscosity of 0.495 dl/g.

40 Parts of the copolyphenylene ether was mixed thoroughly with 10 parts of a mixture in a weight ratio of 1.1:1.0 of the same styrene/butadiene block copolymer as used in Example 2 and the same polystyrene as used in Example 2, 5 parts ot triphenyl phosphate, 7 parts of titanium oxide and 1 part of a heat stabilizer by a Henschel mixer, and the mixture was extruded through a twin-screw extruder to form a blended resin composition.

A molded article prepared from the composition had a heat distrotion temperature (after annealing) of 120° C., a tensile strength of 535 Kg/cm$^2$, an elongation of 52%, a flexural strength of 900 Kg/cm$^2$, an Izod impact strength (using a ⅛ inch notched bar) of 16.5 Kg.cm/cm, and a tensile impact strength of 115 Kg.cm/cm$^2$. After the molded article was aged at 120° C. for 200 hours, it had a tensile strength of 550 Kg/cm$^2$, an elongation of 35%, a flexural strength of 941 Kg/cm$^2$, an Izod impact strength of 12.1 Kg.cm/cm, and a tensile impact strength of 90 Kg.cm/cm$^2$.

EXAMPLE 4

A mixture of a 90/10 molar ratio of 2,6-dimethylphenol and 2,3,6-trimethylphenol was dissolved in a toluene solution containing 7% by weight of the same high impact polystyrene as used in Example 1 so that the concentration of the monomeric mixture became 10% by weight. Air was passed through the solution in the presence of a copper/amine complex catalyst to polycondense the phenols. There was obtained a resin composition comprising a copolyphenylene ether consisting of 2,6-dimethylphenol and 2,3,6-trimethylphenol in a molar ratio of 90:10 and the high impact polystyrene. In this resin composition, the ratio of the copolyphenylene ether to the high impact polystyrene was 60:40 by weight.

One part of a heat stabilizer, 5 parts of triphenyl phosphate and 7 parts of titanium oxide were added to 100 parts of the resin composition, and they were fully mixed by a Henschel mixer. The mixture was extruded through a twin-screw extruder to form a blended resin composition.

A molded article prepared from the composition had a heat distortion temperature (after annealing) of 148° C., a tensile strength of 735 Kg/cm$^2$, an elongation of 49%, a flexural strength of 1,105 Kg/cm$^2$, an Izod impact strength of 12.3 Kg.cm/cm and a tensile impact strength of 145 Kg.cm/cm$^2$. After the molded article was aged at 120° C. for 200 hours, it had a tensile strength of 780 Kg/cm$^2$, an elongation of 27%, a flexural strength of 1,185 Kg/cm$^2$, an Izod impact strength of 10.9 Kg.cm/cm, and a tensile impact strength of 115 Kg.cm/cm$^2$.

EXAMPLE 5

30 Parts of copolyphenylene ether derived by a similar method to Example 1 from 2,6-dimethyl phenol and 2,3,6-trimethylphenol in a molar ratio of 90:10 and having an intrinsic viscosity of 0.5 dl/g was thoroughly mixed with 60 parts of the same high impact polystyrene used in Example 1, 10 parts of the same mixture of the styrene-butadiene block copolymer and polystyrene and used in Example 2, 5 parts of triphenyl phosphate, 7 parts of titanium oxide and 1 part of a heat stabilizer by means of a Henschel mixer. The mixture was extruded through a twin-screw extruder to form a blended resin composition.

The composition was injection-molded at an injection pressure of 1,000 Kg/cm² and a maximum injection temperature of 230° C. The molded article (designated as C) had the properties shown in Table 2.

For comparison, the above procedure was repeated except that 30 parts of poly(2,6-dimethyl-1,4-phenylene) ether having an intrinsic viscosity of 0.50 dl/g was used instead of the copolyphenylene ether. The resulting molded article (designated as D) had the properties shown in Table 2.

Table 2

| Molded Article | C | D |
|---|---|---|
| | After aging at 100° C | After aging at 100° C |
| Properties | Initial stage / for 200 hours | Initial stage / for 200 hours |
| Heat distortion temperature (° C, load 18.4 Kg/cm²) | 115 (after annealing) | 108 (after annealing) |
| Tensile strength (Kg/cm²) | 465 / 480 | 430 / 435 |
| Flexural strength (Kg/cm²) | 840 / 875 | 810 / 835 |
| Elongation (%) | 35 / 23 | 27 / 12 |
| Izod impact strength (Kg.cm/cm, using a ⅛" notched bar) | 16 / 14 | 14 / 10 |
| Tensile impact strength (Kg.cm/cm²) | 100 / 100 | 100 / 45 |

EXAMPLES 6 to 9

The procedure of Example 5 was repeated except that each of the following resins was used instead of the mixture of the styrene-butadiene block copolymer and the polystyrene used in Example 5.

EXAMPLE 6

A strene-butadiene block copolymer derived from 60 parts of styrene and 40 parts of butadiene and having a flow value, as measured under a load of 60 Kg/cm² at 200° C. using a Koka-type flow tester with a nozzle having a diameter of 1 mm and a length of 2mm (a product of Shimadzu Sweisakusho Ltd.), of $6.9 \times 10^{-2}$ cc/sec.

EXAMPLE 7

A mixture in a weight ratio of 30:70 polyisoprene (Mooney viscosity of 95) and the same polystyrene as used in Example 2.

EXAMPLE 8

A mixture in a weight ratio of 15:35: 50 of an ethylene/propylene/5-ethylidene-norbornene copolymer (having a Mooney viscosity of 75), a styrene/ethylene/butylene copolymer having a solution viscosity in a 20% by weight toluene solution at 25° C. of 2,000 cps, as measured by a Brookfield Model RVT Viscometer, and the same polystyrene as used in Example 2.

EXAMPLE 9

A mixture in a weight ratio of 15:35:50 of an acrylic rubber (having a Mooney viscosity of 50) the same styrene/butadiene block copolymer used in Example 2 and the same polystyrene resin as used in Example 2.

The results are shown in Table 3.

Table 3

| Examples | 6 | | 7 | | 8 | | 9 | |
|---|---|---|---|---|---|---|---|---|
| Properties | Initial stage | After aging in hot air at 100° C. for 200 hours | Initial stage | After aging in hot air at 100° C. for 200 hours | Initial stage | After aging in hot air at 100° C for 200 hours | Initial stage | After aging in hot air at 100° C for 200 hours |
| Heat distortion temperature (after annealing, ° C) | 113 | | 113 | | 115 | | 116 | |
| Tensile strength (Kg/cm²) | 450 | 470 | 455 | 470 | 460 | 480 | 480 | 500 |
| Flexural strength (Kg/cm²) | 825 | 850 | 830 | 855 | 840 | 870 | 860 | 890 |
| Elongation (%) | 40 | 30 | 40 | 33 | 35 | 32 | 30 | 25 |
| Izod impact strength (Kg.cm/cm, using a ⅛" notched bar) | 15 | 13 | 14 | 13 | 16 | 15 | 14 | 12 |
| Tensile impact strength (Kg.cm/cm², s-type) | 100 | 87 | 100 | 90 | 120 | 110 | 90 | 80 |

EXAMPLE 10

20 Parts of the same copolyphenylene ether used in Example 1, 70 parts of a commercially available high impact polystyrene (a rubber-moldified polystyrene having a flow value, as measured under a load of 15 Kg/cm² at 220° C. using a Koka-type flow tester with a nozzle having a diameter of 1 mm and a length of 2mm, a product of Shimadzu Seisakusho Ltd., of $26 \times 10^{-3}$ cc/sec.), 10 parts of the same styrene-butadiene block copolymer/polystyrene mixture used in Example 2 and 1 part of a heat stabilizer were thoroughly mixed by a Henschel mixer. The mixture was extruded through a twin-screw extruder to form a blended composition.

The properties of a molded article prepared from the resulting composition are shown in Table 4.

EXAMPLE 11

The procedure of Example 10 was repeated except that the amounts of the copolyphenylene ether and the high impact polystyrene were changed to 10 parts and 80 parts respectively. The properties of a molded article prepared from the resulting resin composition are shown in Table 4.

Table 4

| Examples | 10 | | 11 | |
|---|---|---|---|---|
| Properties | Initial stage | After aging in hot air at 100° C for 200 hours | Initial stage | After aging in hot air at 100° C. for 200 hours |
| Heat distortion temperature (° C, after annealing) | 115 | | 107 | |
| Tensile strength (Kg/cm$^2$) | 450 | 470 | 420 | 440 |
| Flexural strength (Kg/cm$^2$) | 800 | 820 | 730 | 750 |
| Elongation (%) | 30 | 25 | 25 | 22 |
| Izod impact strength (Kg.cm/cm, using a ⅛" notched bar) | 13 | 11 | 10 | 8.5 |
| Tensile impact strength (Kg.cm/cm$^2$, s-type) | 90 | 80 | 80 | 70 |

EXAMPLE 12

A monomeric mixture consisting of 2,3,6-trimethylphenol and 2,6-dimethylphenol in a molar ratio of 5:95 was oxidatively polycondensed in the same manner as in Example 1 to afford a copolyphenylene ether having an intrinsic viscosity of 0.52 dl/gr.

75 Parts of the resulting copolyphenylene ether, 20 parts of the same high impact polystyrene used in Example 10, 5 parts of the same styrene-butadiene block copolymer/polystyrene mixture as used in Example 2, 5 parts of triphenyl phosphate, 10 parts of titanium oxide and 1 part of a heat stabilizer were mixed thoroughly by a Henschel mixer. The mixture was extruded through a twin-screw extruder to form a blended composition.

A molded article prepared from the composition had the properties shown in Table 5.

EXAMPLE 13

The procedure of Example 12 was repeated except that the amounts of the copolyphenylene ether and the high impact polystyrene were changed to 85 parts and 10 parts respectively.

A molded article prepared from the resulting resin composition had the properties shown in Table 5.

Table 5

| Examples | 12 | | 13 | |
|---|---|---|---|---|
| Properties | Initial stage | After aging in hot air at 120° C for 200 hours | Initial stage | After aging in hot air at 120° C for 200 hours |
| Heat distortion temperature (° C, after annealing) | 147 | | 159 | |
| Tensile strength (Kg/cm$^2$) | 700 | 730 | 720 | 740 |
| Flexural strength (Kg/cm$^2$) | 1120 | 1180 | 1150 | 1190 |
| Elongation (%) | 70 | 60 | 80 | 80 |
| Izod impact strength (Kg.cm/cm, using a ⅛" notched bar) | 19 | 17 | 15 | 13 |
| Tensile impact strength (Kg.cm/cm$^2$, s-type) | 170 | 150 | 250 | 200 |

What we claim is:

1. A thermoplastic blended resin composition comprising
   1. 5 to 95% by weight of a copolyphenylene ether composed of 50 to 98 mole % of a structural unit of the formula

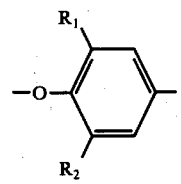

wherein $R_1$ and $R_2$ are identical or different and each represents methyl or ethyl, and 2 to 50 mole % of a structural unit of the formula

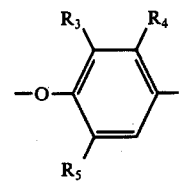

wherein $R_3$, $R_4$ and $R_5$ are identical or different and each represents methyl or ethyl, the total proportion of the two structural units being 100 mole % based on the copolymer, and
   2. 5 to 95% by weight of at least one styrene resin selected from the group consisting of (A) a homopolymer of styrene monomer, α-methyl styrene monomer, vinyl toluene monomer or nucleus-chlorinated styrene monomer, (B) copolymer of at least two of said monomers and (C) a copolymer of one of said monomers with at least one member of olefins, acrylic compounds and conjugated dienes, the total amount of components (1) and (2) being 100% by weight based on the total weight of the resin composition.

2. The composition of claim 1 wherein the styrene resin is at least one member selected from the group consisting of a styrene/acrylonitrile copolymer, a styrene/butadiene copolymer, a styrene/ethylene copolymer, a styrene/propylene copolymer, a styrene/methyl methacrylate copolymer, a styrene/isoprene copolymer, a styrene/chloroprene copolymer, a styrene/butadiene/acrylonitrile copolymer and an ethylene/propylene/butadiene/styrene copolymer.

3. The composition of claim 1 wherein the styrene resin is a high impact polystyrene.

4. The composition of claim 1, wherein each of $R_1$, $R_2$, $R_3$, $R_4$ and $R_5$ is methyl.